No. 630,649. Patented Aug. 8, 1899.
F. A. BRIGGS.
GRIP FOR BICYCLES.
(Application filed Mar. 14, 1899.)
(No Model.)
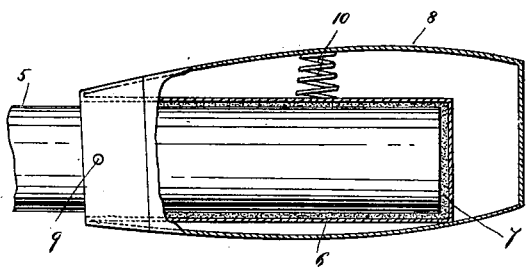
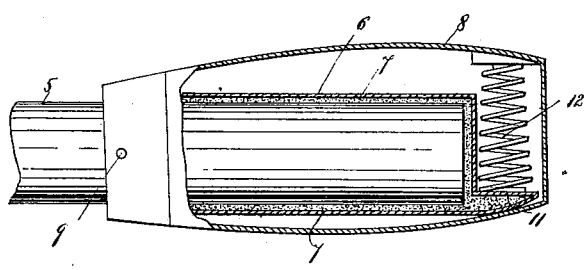
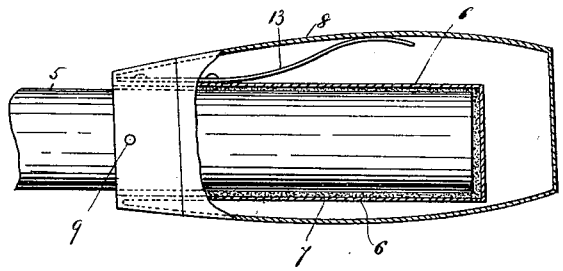
WITNESSES
John Buckler
F. A. Stewart
INVENTOR
Frank A. Briggs
BY
Edgar Tate & Co.
ATTORNEYS

UNITED STATES PATENT OFFICE.

FRANK ANDRE BRIGGS, OF NEW WHATCOM, WASHINGTON.

GRIP FOR BICYCLES.

SPECIFICATION forming part of Letters Patent No. 630,649, dated August 8, 1899.

Application filed March 14, 1899. Serial No. 709,020. (No model.)

*To all whom it may concern:*

Be it known that I, FRANK ANDRE BRIGGS, a citizen of the United States, residing at New Whatcom, in the county of Whatcom and State of Washington, have invented certain new and useful Improvements in Handles or Grips for Bicycles and Similar Vehicles, of which the following is a full and complete specification, such as will enable those skilled in the art to which it appertains to make and use the same.

This invention relates to handles or grips for the handle-bars of bicycles and similar vehicles; and the object thereof is to provide improved handles or grips of this class which are spring-supported, so as to prevent the vibration, jolt, or jar to the arms and shoulders occasioned by handles or grips as usually constructed; and with this and other objects in view the invention consists in the construction hereinafter described and claimed.

The invention is fully disclosed in the following specification, of which the accompanying drawings form a part, in which—

Figure 1 is a side view of one end of a handle-bar provided with my improved handle or grip, part of the construction being shown in section; and Figs. 2 and 3 similar views showing modifications.

In the drawings forming part of this specification the separate parts of my improvement are designated by the same numerals of reference in each of the views, and in said drawings I have shown at 5 one end of a handle-bar, and in the practice of my invention I provide a handle or grip which comprises two parts, one of which consists of a central tube 6, which is open at one end and closed at the other and which is adapted to be passed on over the end of the handle-bar and secured thereto in any desired manner, either by cement or any other preferred means. In the drawings the tube 6 is shown as loosely fitting the handle-bar, the object of this being to provide a space for cement, as shown at 7, but any suitable means may be provided for connecting the tube 6 with the end of the handle-bar. The other part of my handle or grip consists of a tubular portion 8, which is cylindrical in form in cross-section and larger at the central portion than at the ends and the outer end of which is closed and the inner end open. The diameter of the tubular portion 8 is greater at the outer than at the inner end, and the inner diameter of said tubular portion is substantially the same as the outer diameter of the tube 6, and the tubular portion 8 at its inner end is pivotally connected with the tube 6 at the opposite sides, as shown at 9, and the outer end of said tubular portion 8 is free to move vertically.

In Fig. 1 of the drawings I have shown a spiral spring 10 mounted between the tube 6 and the tubular portion 8 of the handle or grip, and in practice the weight is thrown upon the tubular portion 8 of the handle or grip and is yieldingly supported by the spring 10, and this construction prevents, as will be understood, the jolt, jar, or vibration to which the arms, shoulders, and upper portions of the body are subjected when rigid handles or grips are employed.

In Fig. 2 I have shown a modification in which the outer end of the tube 6 is provided at the bottom thereof with a projection 11, which is also inclosed by the outer end of the tubular portion 8 of the handle or grip, and mounted on said projection is a spring 12, which supports the outer end of the tubular portion 8, and the operation of this form of construction will be the same as that shown in Fig. 1.

In the form of construction shown in Fig. 3 a leaf-spring 13 is employed, the inner end of which is secured between the inner ends of the tube 6 and the tubular portion 8 of the handle or grip, and the outer end of which is curved upwardly and supports the outer end of the tubular portion 8 of said handle or grip.

In each of the forms of construction shown it will be seen that the tubular portions 6 and 8 of the handle or grip and their connections are substantially the same, the only difference being in the location and method of supporting the springs 10, 12, and 13.

My improvement is simple in construction and operation and well adapted to accomplish the result for which it is intended, and it will be apparent that changes in and modifications of the construction described may be made without departing from the spirit of my invention or sacrificing its advantages.

Having fully described my invention, I claim as new and desire to secure by Letters Patent—

1. The herein-described handle or grip for the handle-bar of bicycles and similar vehicles, comprising two rigid tubular parts, one of which is placed within the other, the inner ends of said parts being open and pivotally connected at opposite sides, the outer part being greater in diameter than the inner part, and a spring connected with or mounted on the inner part and adapted to support the outer end of the outer part, said inner part being adapted to be slipped onto and secured to the handle-bar, substantially as shown and described.

2. A handle or grip for the handle-bar of bicycles and similar vehicles, comprising two rigid tubular parts, one of which is placed within the other, and both of which are open at their inner ends, said parts being pivotally connected at their inner ends at the opposite sides thereof, the outer part being larger in cross-section at its outer end than the inner part, and a spring connected with the outer end of the inner part and adapted to support the outer end of the outer part, substantially as shown and described.

In testimony that I claim the foregoing as my invention I have signed my name, in presence of the subscribing witnesses, this 3d day of March, 1899.

FRANK ANDRE BRIGGS.

Witnesses:
H. D. MCARTHUR,
D. J. MCARTHUR.